US011504796B2

(12) United States Patent
Sawanishi et al.

(10) Patent No.: US 11,504,796 B2
(45) Date of Patent: Nov. 22, 2022

(54) RESISTANCE SPOT WELDING METHOD (71) Applicant: JFE STEEL CORPORATION, Tokyo (JP)

(72) Inventors: Chikaumi Sawanishi, Tokyo (JP); Yasuaki Okita, Tokyo (JP); Rinsei Ikeda, Tokyo (JP)

(73) Assignee: JFE STEEL CORPORATION, Tokyo (JP)

( * ) Notice: Subject to any disclaimer, the term of this patent is extended or adjusted under 35 U.S.C. 154(b) by 860 days.

(21) Appl. No.: 15/024,164

(22) PCT Filed: Sep. 12, 2014

(86) PCT No.: PCT/JP2014/074760
§ 371 (c)(1),
(2) Date: Mar. 23, 2016

(87) PCT Pub. No.: WO2015/049998
PCT Pub. Date: Apr. 9, 2015

(65) Prior Publication Data
US 2016/0236294 A1    Aug. 18, 2016

(30) Foreign Application Priority Data
Oct. 4, 2013   (JP) .............................. JP2013-209268

(51) Int. Cl.
*B23K 11/24*    (2006.01)
*B23K 11/25*    (2006.01)
(Continued)

(52) U.S. Cl.
CPC ............. *B23K 11/24* (2013.01); *B23K 11/115* (2013.01); *B23K 11/166* (2013.01);
(Continued)

(58) Field of Classification Search
CPC .. B23K 9/0671; B23K 9/0672; B23K 11/115; B23K 11/257; B23K 11/258;
(Continued)

(56) References Cited

U.S. PATENT DOCUMENTS 4,849,601 A * 7/1989 Haefner ............... B23K 11/257
219/110
5,483,035 A   1/1996 Kawai et al.
(Continued)

FOREIGN PATENT DOCUMENTS

EP   0 127 299 A1   12/1984
EP   0 891 836 A2    1/1999
(Continued)

OTHER PUBLICATIONS

Dec. 16, 2014 International Search Report issued in International Patent Application No. PCT/JP2014/074760.
(Continued)

*Primary Examiner* — Helena Kosanovic
*Assistant Examiner* — Ahmad Abdel-Rahman
(74) *Attorney, Agent, or Firm* — Oliff PLC (57) ABSTRACT

Proposed is a resistance spot welding method to join parts to be welded which are a plurality of overlapping metal sheets, including: dividing a current pattern into two or more steps for welding; before actual welding, performing test welding; and subsequently, as actual welding, performing adaptive control welding, in which the two or more steps for welding include a step of securing a current path between the sheets directly below the electrodes and a subsequent step of forming a nugget having a predetermined diameter, and a welding interval time is provided between these steps. This method thus yields a good nugget without causing splashing even under special welding conditions.

6 Claims, 5 Drawing Sheets

(51) Int. Cl.
  *B23K 11/11*  (2006.01)
  *B23K 11/16*  (2006.01)
  *B23K 101/34*  (2006.01)
  *B23K 101/18*  (2006.01)
  *B23K 103/04*  (2006.01)

(52) U.S. Cl.
  CPC .... *B23K 2101/185* (2018.08); *B23K 2101/34* (2018.08); *B23K 2103/04* (2018.08)

(58) Field of Classification Search
  CPC .............. B23K 11/256; B23K 2101/34; B23K 2101/185; B23K 11/24
  USPC .......................................................... 219/91
  See application file for complete search history.

(56) References Cited

U.S. PATENT DOCUMENTS

| | | | | |
|---|---|---|---|---|
| 5,793,011 | A * | 8/1998 | Watanabe | B23K 11/115 219/109 |
| 6,057,523 | A | 5/2000 | Fujii et al. | |
| 6,130,396 | A | 10/2000 | Hasegawa et al. | |
| 8,878,093 | B2 * | 11/2014 | Wang | G01N 27/048 219/117.1 |
| 2016/0144451 | A1 * | 5/2016 | Fujimoto | B23K 11/16 219/92 |

FOREIGN PATENT DOCUMENTS

| | | |
|---|---|---|
| JP | H07-303973 A | 11/1995 |
| JP | H09-216071 A | 8/1997 |
| JP | H10-94883 A | 4/1998 |
| JP | H11-33743 A | 2/1999 |
| JP | 2002-096178 A | 4/2002 |
| JP | 2003-236674 A | 8/2003 |
| JP | 2010-207909 A | 9/2010 |
| JP | 2010-221284 A | 10/2010 |
| JP | 2010-240740 A | 10/2010 |
| JP | 2010-247215 A | 11/2010 |
| JP | 2012-045569 A | 3/2012 |

OTHER PUBLICATIONS

Aug. 2, 2016 Extended Search Report issued in European Patent Application No. 14851320.3.

* cited by examiner

RESISTANCE SPOT WELDING METHOD

TECHNICAL FIELD

This disclosure relates to a resistance spot welding method, and in particular, this disclosure attempts to form a suitable nugget by using adaptive control welding.

BACKGROUND

In general, resistance spot welding, which is at type of lap resistance welding, is used to join overlapping steel sheets.

This welding method is a method to on two or more overlapping steel sheets by applying a high welding current: for a short: time between a pair of electrodes squeezing the steel sheets front above and below. A point-like weld is obtained using the resistance heat generated by passing the high welding current. Such a point-like weld is referred to as a nugget and is the portion where both of the overlapping steel sheets fuse and coagulate at a location of contact between the steel sheets when current is applied to the steel sheets. The steel sheets are joined in a point-like manner by this nugget.

In order to obtain good weld quality, it is important to form the nugget which has an appropriate diameter. The nugget diameter is determined by welding conditions such as the welding current, welding time electrode shape, electrode force, and the like. Therefore, to form an appropriate nugget diameter, the above welding conditions need to be set appropriately in accordance with the conditions of parts to be welded, such as the material properties, sheet thickness, number of sheets overlapped, and the like.

For example, when manufacturing automobiles, spot welding is performed at several thousand points per automobile, and workpieces that arrive one after another need to be welded. At this time, if the conditions of parts to be welded, such as the material properties, sheet thickness, number of sheets overlapped, and the like are identical, then the same nugget diameter can be obtained under the same welding conditions such as the welding current, welding time, electrode force, and the like. During consecutive welding, however, the surfaces of the electrodes in contact with the parts to be welded gradually wear, so that the contact area gradually expands beyond that of the initial state. If the same welding current as in the initial state is applied after the contact area has thus expanded, the current density in the parts to be welded lowers, and the temperature rise in the weld is reduced. The nugget diameter therefore decreases. Hence, for every several hundred to several thousand spots of welding, the electrodes are either dressed or replaced, so that the electrode tip diameter does not expand excessively.

A resistance welding device provided with a function (stepper function) to increase the welding current after welding a predetermined number of times, so as to compensate for the reduction in current density due to wear of the electrodes, has also been used conventionally. To use that stepper function, the above-described pattern for changing the welding current needs to be set appropriately in advance. Performing tests or the like, however, to derive a pattern for changing the welding current that corresponds to numerous conditions of parts to be welded and welding conditions is highly time-consuming and expensive.

The state of progress of electrode wear also varies during actual work. Therefore, the predetermined pattern for changing the welding current cannot always be considered appropriate.

Furthermore, when there is as disturbance at the time of welding, such as when a point that has already been welded (existing weld) is located near the point being welded, or when the surface of the parts to be welded is highly uneven and a contact point between the parts to be welded is located near the point being welded, then welding current diverts to the existing weld or the contact point. In such a state, the current density is reduced at the position to be welded between sheets directly below the electrodes, even when welding under predetermined conditions. A nugget of sufficient diameter therefore cannot be obtained.

In order to compensate for this insufficient amount of heat generated and to obtain a nugget of sufficient diameter, it becomes necessary to set a high welding current in advance.

Techniques such as the following have been proposed to resolve the above problem.

For example, JPH9-216071A (PTL 1) describes a control unit of a resistance welder that obtains a set nugget by comparing an estimated temperature distribution of the weld with a target nugget and controlling output of the welder.

JPH10-94883A (PTL 2) describes a method of controlling welding conditions of a resistance welder to achieve good welding by detecting the welding current and the voltage between tips, performing a simulation of the weld by heat transfer calculation, and estimating the formation state of the nugget.

Furthermore, JPH11-33743A (PTL 3) describes a welding system that first uses the sheet thickness of the parts to be welded and the welding time to calculate the cumulative amount of heat generated per unit volume that allows for good welding of the parts to be welded and then adjusts the welding current or voltage that yields the calculated amount of heat generated per unit volume and unit time. By using this system, a good weld is achieved regardless of the type of parts to be welded or the wear state of the electrodes.

With the resistance spot welding methods in PTL 1 and PTL 2, however, complicated calculations are necessary in order to estimate the temperature of the nugget based on a heat transfer model (heat transfer simulation) or the like. As a result, the structure of the welding control unit not only becomes complicated, but the welding control unit itself also becomes expensive.

Indeed, the resistance spot welding method recited in PTL 3 always allows for good welding regardless of the degree of electrode wear by controlling the cumulative amount of heat generated to be a target value. When the set conditions of parts to be welded and the actual conditions of parts to be welded greatly differ, however, for example in cases such as when there is a disturbance nearby such as the aforementioned existing weld, when the time variation pattern of the amount of heat generated changes greatly in a short period of time, or when welding hot-dip galvanized steel sheets with a large coating weight, then adaptive control may not keep up. In such case, even if the final cumulative amount of heat generated, can be controlled to be a target value, the form of heat generation i.e. the time variation of temperature distribution of the weld deviates from the pattern of amount of heat in which a targeted good weld, is obtained, and therefore the necessary nugget diameter may not be obtained, or splashing may occur.

For example, if an attempt is made to control the cumulative amount of heat generated to be a target value in the case of shunting having a large effect, the current significantly increases in a state where the current-passing area between the steel sheets is not secured. Therefore, heat generation in the vicinity of a site between the electrode and the steel sheet becomes significant instead of a site between steel sheets, and splashing tends to occur from the steel sheet surface.

Furthermore, all of the techniques in PTL 1 to PTL 3 effectively address the change when the electrode tip wears, yet do not at all take into account the case of shunting having a large effect, such as when the distance from an existing weld is short. Hence, adaptive control sometimes did not actually work.

To address this issue, we previously developed and disclosed in Japanese Patent Application No. 2013-47180 (PTL4): a method of resistance spot welding to join parts to be welded by squeezing and pressing the parts between a pair of electrodes and passing current, the parts being a plurality of overlapping metal sheets, the method comprising: dividing a current pattern into two or more steps for welding; before actual welding, performing test welding to store, for each step as a target value, a time variation of an instantaneous amount of heat generated per unit volume and a cumulative amount of heat generated per unit volume that are calculated from an electrical property between electrodes when forming an appropriate nugget by passing current with constant current control; and subsequently, as actual welding, starting welding using, as a standard, a time variation curve of the instantaneous amount of heat generated per unit volume obtained by the test welding, and when a time variation amount of an instantaneous amount of heat generated deviates during any step from the time variation curve by a difference, performing adaptive control welding to control a current passage amount in order to compensate for the difference during a remaining welding time in the step so as to match a cumulative amount of heat generated in the actual welding to the cumulative amount of heat generated that is determined in advance in the test welding.

CITATION LIST

Patent Literature

PTL 1: JPH9-216071A
PTL 2: JPH10-94883A
PTL 3: JPH11-33743A
PTL 4: Japanese Patent Application No. 2013-47180

SUMMARY

Technical Problem

The development of the technique disclosed in PTL 4 has enabled obtaining a nugget with a good diameter even when the electrode tip wears or when there is a disturbance.

However, under special welding conditions, for example in cases such as when a particularly large nugget diameter needs to be guaranteed, when there is an existing weld in the close proximity, or when there are multiple existing welds around the welding point, the pattern of amount of heat may deviate from the targeted pattern of amount of heat in test welding. In such case, heat generation sometimes becomes excessive in the vicinity of the electrodes and may lead to splashing, and therefore a nugget with a satisfactory diameter cannot be obtained.

It could therefore be helpful w provide a resistance spot welding method that yields a nugget with an appropriate diameter without causing splashing even under special welding conditions as described above.

Solution to Problem

In order to achieve the above object, we have made intensive studies. As a result, we found that by providing a welding interval time of a certain period, of time between the step of securing a current path between the sheets directly below the electrodes and the subsequent step of forming a nugget, the temperature in the vicinity of the electrodes is effectively lowered, and the temperature distribution of the electrodes can be set to follow the targeted temperature distribution (pattern of amount of heat) in test welding, and thus the desired object can be advantageously achieved.

This disclosure was completed based on these findings.

We thus provide:

1. A resistance spot welding method to loin parts to be welded by squeezing and pressing the parts between a pair of electrodes and passing current, the parts being a plurality of overlapping metal sheets, the method comprising:

dividing a current pattern into two or more steps for welding;

before actual welding, performing test welding to store, for each step as a target value, a time variation of an instantaneous amount of heat generated per unit volume and a cumulative amount of heat generated per unit volume that are calculated from an electrical property between electrodes when forming an appropriate nugget by passing current with constant current control; and subsequently, as actual welding, starting welding using, as a standard, a time variation curve of the instantaneous amount of heat generated per unit volume obtained by the test welding, and when a time variation amount of an instantaneous amount of heat generated deviates during any step from the time variation curve by a difference, performing adaptive control welding to control a current passage amount in order to compensate for the difference during a remaining welding time in the step so as to match a cumulative amount of heat generated in the actual welding to the cumulative amount of heat generated that is determined in advance in the test welding, wherein the two or more steps for welding comprise a step of securing a current path between the sheets directly below the electrodes and a subsequent step of forming a nugget having a predetermined diameter, and a welding, interval time is provided between the step of securing a current path between the sheets directly below the electrodes and the subsequent step of forming a nugget having a predetermined diameter, 2. The method according to aspect 1, wherein the welding interval time is one cycle or more and ten cycles or less.

Advantageous Effect

Even under special welding conditions such as when a particularly large nugget diameter is required, when there is an existing weld in the close proximity, or when there are multiple existing welds around the welding point, a nugget with a good diameter can be obtained without causing splashing.

DETAILED DESCRIPTION

Our methods will be described in detail below.

In our methods, resistance spot welding is performed by multistep welding current in which the current pattern is divided into two or more steps, and before actual welding, test welding is performed to store, for each step as target values, a time variation of an instantaneous amount of heat generated per unit volume and a cumulative amount of heat generated per unit volume that are calculated from an electrical property between electrodes when forming an appropriate nugget. In actual welding, even if the time variation amount of the instantaneous amount of heat generated deviates during any step from the time variation curve that is a standard, adaptive control welding is then utilized to compensate for the difference during the remaining welding time in the step so as to match a cumulative amount of heat generated in the actual welding to the cumulative amount of heat generated that is determined in advance in the test welding, and further a welding interval time is provided between the step of securing a current path between sheets directly below the electrodes and the subsequent step of forming a nugget having a predetermined diameter.

To begin with, the basic configuration of multistep adaptive control welding according to the disclosure will be described.

First, test welding will be described. In this example, the case of welding with a two step current pattern is described.

A welding test on the same type of steel and thickness as the parts to be welded is performed under a variety of conditions with constant current control in a state with no gap or shunting to an existing weld. The welding conditions for obtaining a necessary nugget diameter, i.e. the appropriate electrode force F, welding time T, and welding current I, are thus discovered. An inverter DC resistance spot welder is preferable as the welder, and chromium copper electrodes with DR-shaped tips may be advantageously adapted for use as the electrodes. Furthermore, the nugget diameter may be determined by a peel test or by cross-sectional observation at the nugget center (by etching with a saturated picric acid solution).

Next, the point in time at which a fused portion is formed between the steel sheets (the point in time at which a current path is formed between the sheets directly below the electrodes), which are the parts to be welded, may be adopted as the timing for division into steps in the case that the current pattern is divided into two steps. In order to determine this timing, under the same electrode force F and welding current I as above, welding is performed while changing the welding time to discover the point in time at which the fused portion forms.

Formation of the fused portion may be confirmed by a peel test.

Assume that the fused portion forms at welding time T1.

From the above experiment results, the conditions for test welding are determined as follows.

First step welding conditions: electrode force F, welding time T1, welding current I Second step welding conditions: electrode force F, welding time T2 (equal to T−T1), welding current I The time variation of the instantaneous amount of heat generated per unit volume and the cumulative amount of heat generated per unit volume that are calculated from an electrical property between electrodes during welding performed under the above conditions are then stored for each step as respective target values, completing the test welding.

In this disclosure, the electrical property between electrodes refers to the resistance between electrodes or the voltage between electrodes.

In the disclosure, it is important to provide a welding interval time between the above described first step welding and the subsequent second step welding, and this point will be described in detail later.

After the above described test welding, the actual welding is performed.

In the actual welding, welding is started using, as a standard, the time variation curve of the instantaneous amount of heat generated per unit volume obtained by the above described test welding. In each of the steps, when the time variation amount of the instantaneous amount of heat generated follows the time variation curve that is the standard, welding is performed as is to completion.

When the time variation amount of the instantaneous amount of heat generated deviates during any step from the time variation curve that is the standard, however, adaptive control welding is performed to control the current passage amount in response to the difference. That is, compensation is made during the remaining welding time in the step so that the cumulative amount of heat generated in the actual welding matches the cumulative amount of heat generated determined in advance in the test welding.

In this way, the necessary cumulative amount of heat generated is guaranteed even when the electrode tip wears or when there is a disturbance, thereby yielding a nugget with an appropriate diameter.

While the method of calculating the amount of heat generated per unit volume is not limited, PTL 3 discloses one example, which is used in this disclosure.

The cumulative amount of heat generated Q per unit volume is calculated with this method as follows.

Let the total thickness of the two parts to be welded be t, the electrical resistivity of the parts to be welded be r, the voltage between electrodes be V, the welding current be 1, and the area of contact between the electrodes and the parts to be welded be S. In this case, the welding current passes through a columnar portion with a cross-sectional area S and thickness t, generating resistance heat. The amount of heat generated q per unit volume and unit time in this columnar portion is determined with Equation (1) below.

$$q = (V \cdot I)/(S \cdot t) \qquad \text{Equation (1):}$$

The electrical resistance R of this columnar portion is calculated with Equation (2) below.

$$R = (r \cdot t)/S \qquad \text{Equation (2):}$$

By solving for S in Equation (2) and substituting into Equation (1), the amount of heat generated q is given by Equation (3) below.

$$q=(V \cdot I \cdot R)/(r \cdot t^2)=(V^2)/(r \cdot t^2)$$ Equation (3):

As is clear from Equation (3) above, the amount of heat generated q per unit volume and unit time can be calculated from the voltage between electrodes V, total thickness t of parts to be welded, and electrical resistivity r of the parts to be welded. The amount of heat generated q is not affected by the area S of contact between the electrodes and the parts to be welded.

In Equation (3), the amount of heat generated q is calculated from the voltage between electrodes V, yet the amount of heat generated q may also be calculated from the current between electrodes I. In this case as well, the area S of contact between the electrodes and the parts to be welded need not be used.

Accumulating the amount of heat generated q per unit volume and unit time over the entire welding time period yields the cumulative amount of heat generated Q per unit volume that is added during welding. As is clear from Equation (3), this cumulative amount of heat generated Q per unit volume can also be calculated without using the area S of contact between the electrodes and the parts to be welded.

The case of calculating the cumulative amount of heat generated Q using the method disclosed in PTL 3 has been described, yet other methods of calculation may of course be used.

However, in cases where the disturbance is particularly significant, for example in cases such as (1) when a particularly large nugget diameter needs to be guaranteed (e.g. when the nugget diameter is 4.5√t or more), (2) when there is an existing weld in the close proximity (e.g. when the distance between the welding point and the existing weld is 7 mm or less), or when there are multiple existing welds around the welding point, (e.g. when three or more existing welds are present around the welding point), the pattern of amount of heat may deviate from the targeted pattern of amount of heat in test welding. In such case, as previously mentioned, heat generation sometimes becomes excessive in the vicinity of the electrodes and may lead to splashing, and therefore a nugget with a satisfactory diameter cannot be obtained.

For purposes of illustrating an embodiment of the disclosure, a case where the distance between the welding point and the existing weld is narrow will be explained below. The current pattern for this case is also divided into two steps.

As in the case for multistep adaptive control in test welding, current is allowed to flow until the interface between the steel sheets disappears in the first step, and until a predetermined, nugget diameter is obtained in the second step. In the first step, a fused portion may be formed within the range in which splashing does not occur during adaptive control.

In the disclosure, a certain welding interval time is provided between the above described first step (step of securing a current path between the sheets directly below the electrodes) and the subsequent second step (step of forming a nugget having a predetermined diameter). In this way, the temperature in the vicinity of the electrodes is effectively lowered, and the temperature distribution of the electrodes can be set to follow the targeted temperature distribution in test welding.

In the multistep welding conditions of test welding yielding an appropriate weld, obtained from the above first step, welding interval time, and second step, the time variation of the instantaneous amount of heat generated per unit volume and the cumulative amount of heat generated per unit volume in each step are stored together with the welding interval time. In the actual welding, welding is performed using, as a standard, the time variation curve of the instantaneous amount of heat generated per unit volume obtained in the above described test welding. When the time variation amount of the instantaneous amount of beat generated deviates during any step from the time variation curve that is the standard by a difference, adaptive control spot welding is performed to control the welding current by compensating for the difference during the remaining welding time in each step so as to match the cumulative amount of heat generated in each step to the cumulative amount of heat generated stored in test welding.

In this way, the heat generation pattern for each of the divided steps can be controlled to match that in test welding regardless of the presence of the shunting caused by a close existing weld. As a result, stable nugget formation is achieved even in the presence of a special disturbance.

The welding interval time provided between the step of securing a current path between the sheets directly below the electrodes and the subsequent step of forming a nugget having a predetermined diameter, is preferably one cycle or more and ten cycles or less. When the sheet thickness is thin and the beat-extraction effect caused by the electrodes is large, the effect can be obtained with one cycle. However, if the welding interval time exceeds ten cycles, not only will the heating efficiency and operating efficiency be decreased, but a high current will be required for nugget formation and the risk of causing splashing will increase. The welding interval time is preferably in the range of two cycles to eight cycles.

Although the preferable welding time in the step of securing a current path between the sheets directly below the electrodes varies to some extent depending on the electrode force or current in each step, it is preferably three cycles or more and ten cycles or less. If the welding time is less than three cycles, a desirable current-passing area is not secured, and splashing may occur in the subsequent steps. On the other hand, if the welding time exceeds ten cycles, heat generation becomes excessive, and the risk of causing splashing will be increased.

The welding time in the step of forming a nugget is not particularly and current may be allowed to flow for the time required to form a nugget having a predetermined diameter.

While the above mainly explains a case where the current pattern is divided into two steps i.e. the step of securing a current path between the sheets directly below the electrodes and the subsequent step of forming a nugget having a predetermined diameter, the current pattern can optionally be divided into three steps.

Specifically, when the parts to be welded are coated steel sheets, three-step division that takes fusion of the coating into account is more preferable. The reason is that when coating is present, there is a large change in the phenomenon up until a stable current path forms between the sheets directly below the electrodes, where the effect of shunting is large. Since the melting point of the coating is lower than that of the steel sheets, the coating between the steel sheets first fuses after passage of current begins, and a portion of the fused coating is expelled from between the steel sheets due to the electrode force. The coating that is expelled at this time expands the current passing area, thereby greatly reducing the resistance between electrodes during welding. Conversely, the specific resistance of the parts to be welded increases along with a rise in temperature, and therefore, the specific resistance increases as the welding time lengthens. After the decrease in resistance between electrodes due to the expanded current passing area, an increase in the resistance between electrodes occurs due to the rise in temperature of the parts to be welded, and subsequently, the fused portion forms. Therefore, the welding process is divided into three steps, i.e. the step in which the coating fuses and the current conducting area expands suddenly, the step up until a stable current path (fused portion) forms between the electrodes due to subsequent passage of current, and the subsequent nugget formation step, and then, in each step, adaptive control welding is performed to guarantee the cumulative amount of heat generated per unit volume. This allows for a stable current path to be formed by resistance spot welding of coated steel sheets, even if an existing weld is located nearby, and also allows for stable nugget growth in the subsequent third step. In such case, a welding interval time is provided between the steps of the second stage and the third stage.

EXAMPLES

Example 1

Mild steel (thickness: 1.6 mm) was prepared as the parts to be welded. Further, the welding was performed with a two-step current pattern, and a constant welding interval time (cooling time) was provided between the first current passage and the second current passage.

Two sheets of the parts to be welded were overlapped and welded with constant current control in a state with no gap or shunting to an existing weld. The welding conditions for obtaining a suitable nugget diameter were thus obtained. An inverter DC resistance spot welder was used as the welder, and chromium copper electrodes with 6 mm face diameter DR-shaped tips were used as the electrodes. For the welding conditions, an electrode force of 3.5 kN, welding current of the first step of 7.0 kA, welding time of 5 cyc (50 Hz (hereinafter, time units all refer to the number of cycles at 50 Hz)), welding current of the second step of 9.0 kA, welding time of 16 cyc, and cooling time between the first step and the second step of 5 cyc were kept constant. The targeted nugget diameter was set to $5\sqrt{t}$ (t: sheet thickness) (6.3 mm) which is considerably larger than usual.

Figure 1:
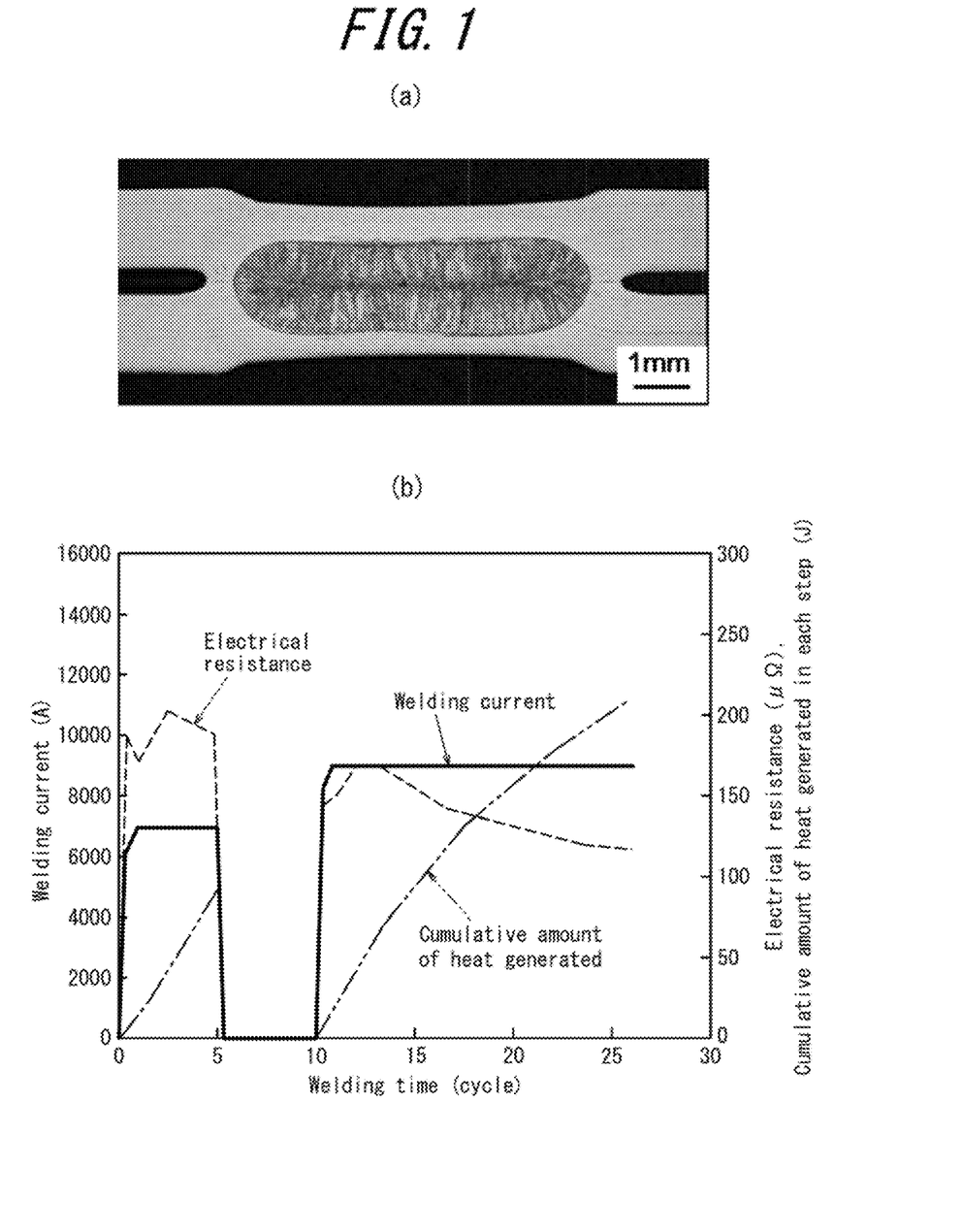
FIG. 1(a) is a weld cross-section when performing test welding.
FIG. 1(b) illustrates the corresponding change over time of the welding current, electrical resistance, and cumulative amount of heat generated in each step.

FIG. 1(a) illustrates a weld cross-section when performing this test welding, and FIG. 1(b) illustrates the corresponding change over time of the welding current, electrical resistance, and cumulative amount of heat generated in each step.

As illustrated in FIG. 1(a), in this test welding, the target nugget diameter of 6.3 mm ($5\sqrt{t}$) was obtained. The target cumulative amount of heat generated that was obtained in the test welding was 91 J for the first step and 210 J for the second step.

Next, the actual welding was performed under the following conditions.

Multistep adaptive control resistance spot welding according to one of the disclosed embodiments was performed with the above test welding as a standard, under the conditions of an existing weld present near the welding point (distance between centers of points: 10 mm) and a large effect of shunting. In other words, resistance spot welding was performed using, as a standard, the time variation curve of the instantaneous amount of heat generated per unit volume obtained in the test welding.

Figure 2:
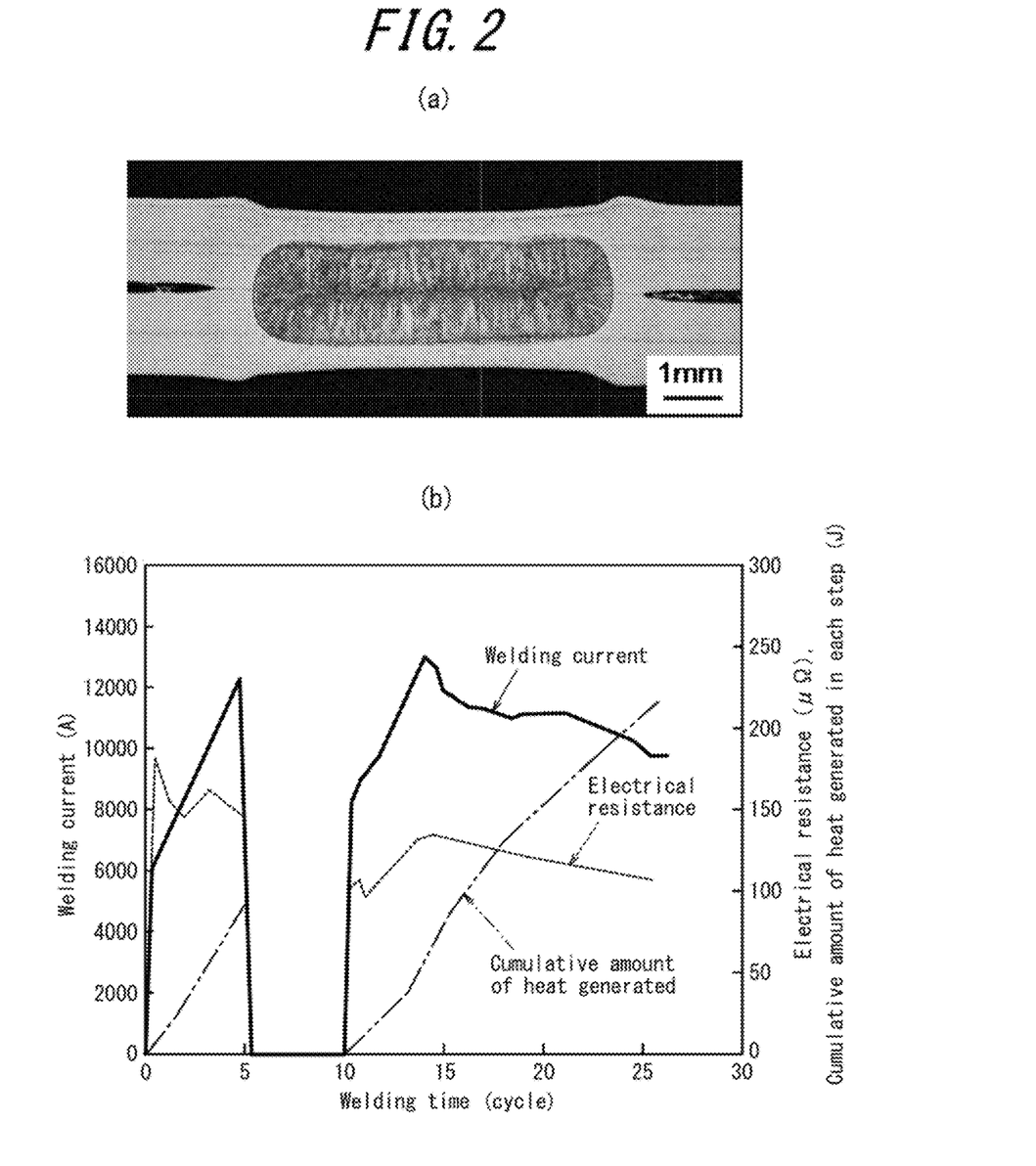
FIG. 2(a) is a weld cross-section when performing two-step adaptive control welding according to the disclosure.
FIG. 2(b) illustrates the corresponding change over time of the welding current, electrical resistance, and cumulative amount of heat generated in each step.

FIG. 2(a) illustrates a weld cross-section when performing this actual welding, and FIG. 2(b) illustrates the corresponding change over time of the welding current, electrical resistance, and cumulative amount of heat generated in each step.

As illustrated in FIG. 2(b), in the actual welding according to the disclosure, the current greatly changed so that the cumulative amount of heat generated in each step became similar to the case of the test welding. As a result, a nugget diameter of 6.2 mm which is nearly the target nugget diameter was achieved. The cumulative amount of heat generated at this time was 92 J for the first step and 215 J for the second step, and both were nearly equal to those of the test welding.

Figure 3:
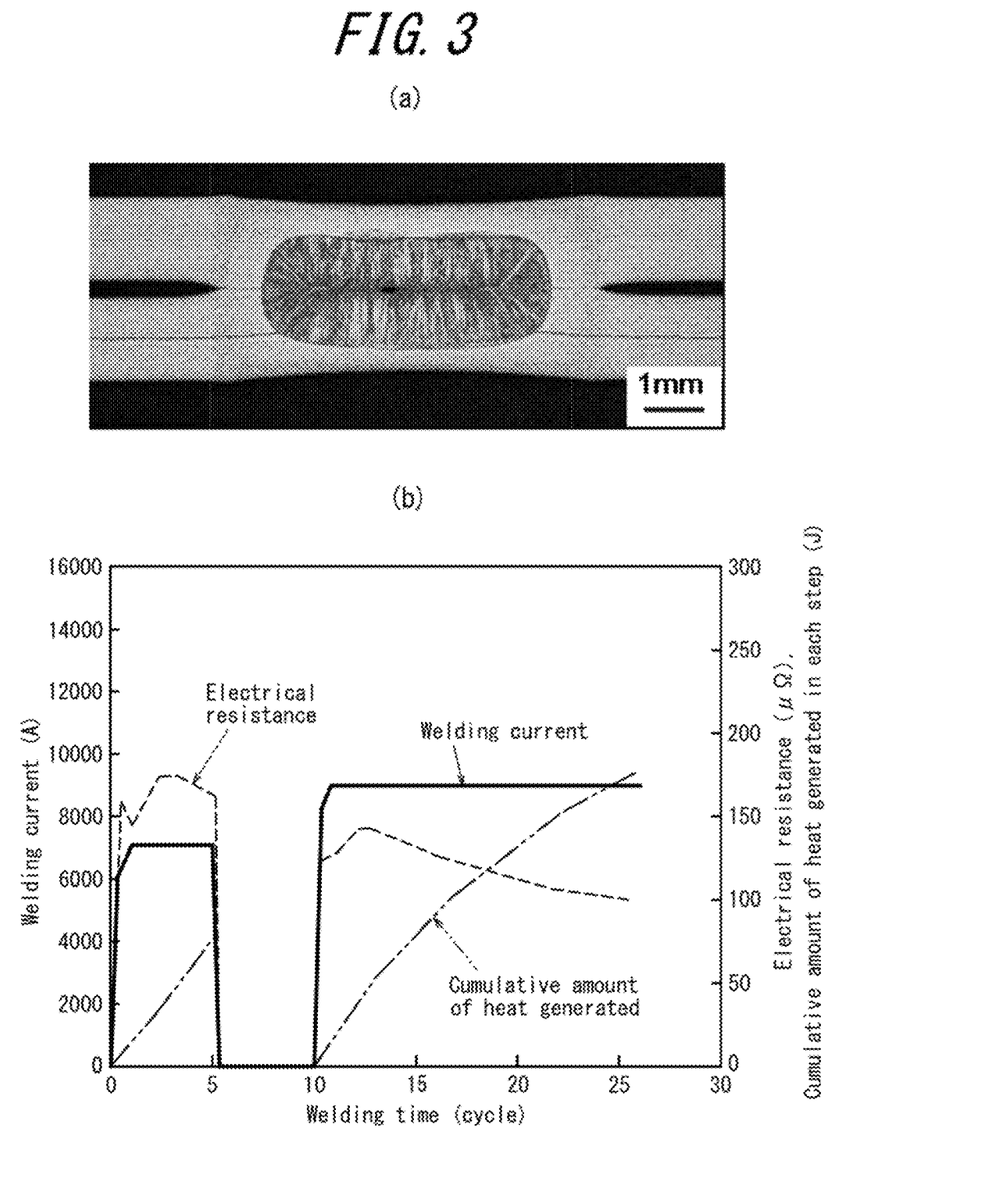
FIG. 3(a) is a weld cross-section when performing conventional constant current control welding.
FIG. 3(b) illustrates the corresponding change over time of the welding current, electrical resistance, and cumulative amount of heat generated.

For comparison, resistance spot welding with constant current control (Comparative Example 1) was performed under the condition of an existing weld present near the welding point (distance between centers of points: 10 mm). The welding conditions were the same as the above test welding (an electrode force of 3.5 kN, welding current of the first step of 7.0 kA, welding time of 5 cyc, welding current of the second step of 9.0 kA, welding time of 16 cyc, and cooling time between the first step and the second step of 5 cyc). FIG. 3(a) illustrates a weld cross-section at this time, and FIG. 3(b) illustrates the corresponding change over time of the welding current, electrical resistance, and cumulative amount of heat generated in each step.

The cumulative amount of heat generated in such case was 77 J for the first step and 179 J for the second step, and a reduction in the amount of heat due to shunting was observed. Further, only nuggets with a small diameter of 4.7 mm were obtained.

For comparison, resistance spot welding with conventional one-step adaptive control was performed under the condition of an existing weld present near the welding point (distance between centers of points: 10 mm). In welding, adaptive control welding (comparative example 2) was performed under the condition of an existing weld being present as in comparative example 1 while using, as a standard, test welding performed under the conditions of an electrode force of 3.5 kN, welding time of 16 cyc, welding current of 9.0 kA, and the absence of existing welds.

Figure 4:
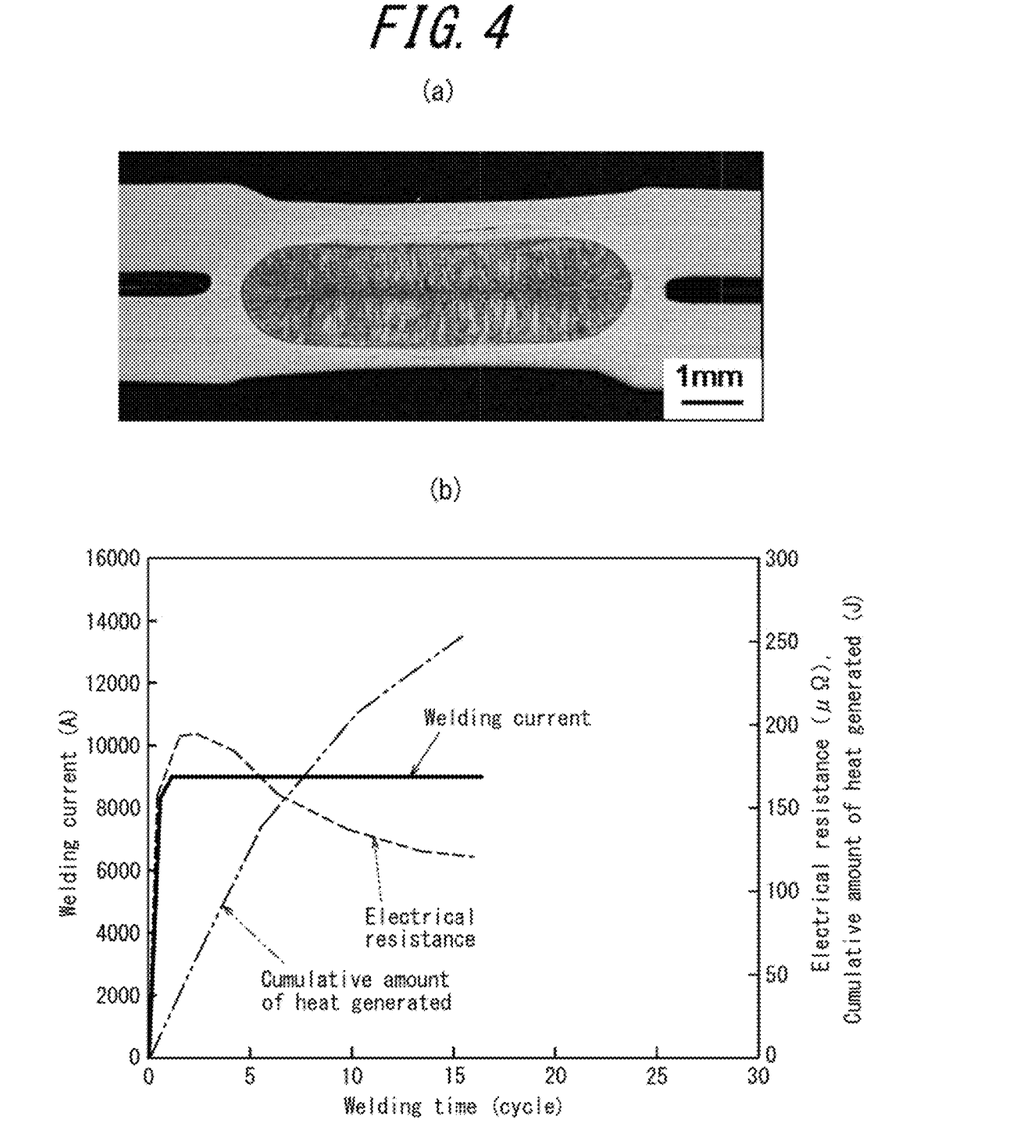
FIG. 4(a) is a weld cross-section when performing test welding by conventional one-step adaptive control welding.
FIG. 4(b) illustrates the corresponding change over time of the welding current, electrical resistance, and cumulative amount of heat generated.
Figure 5:
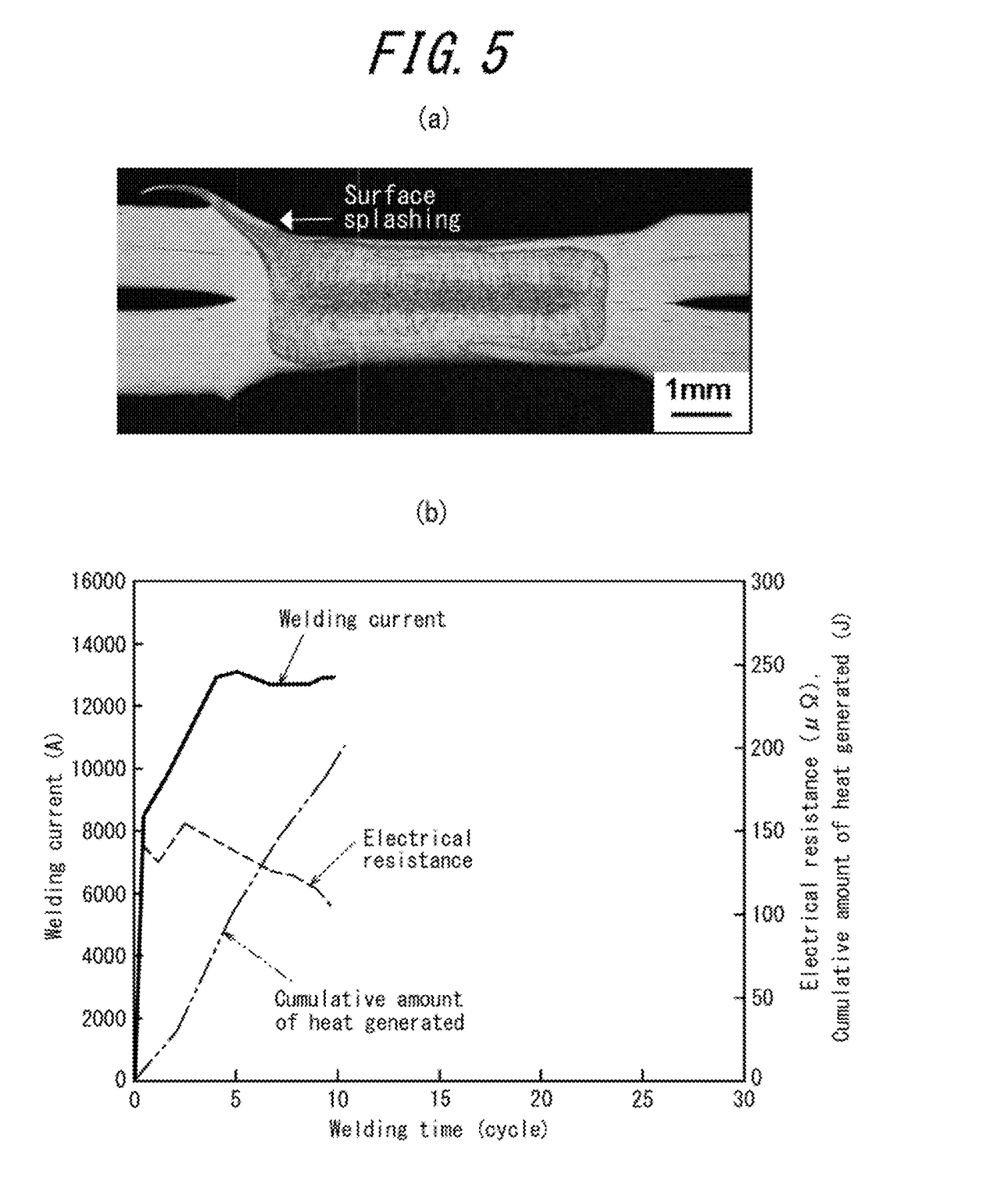
FIG. 5(a) is a weld cross-section when performing actual welding by conventional one-step adaptive control welding.
FIG. 5(b) illustrates the corresponding change over time of the welding current, electrical resistance, and cumulative amount of heat generated.

FIG. 4(a) illustrates a weld cross-section during this test welding, and FIG. 4(b) illustrates the corresponding change over time of the welding current, electrical resistance, and cumulative amount of heat generated. FIG. 5(a) illustrates a weld cross-section when performing one-step adaptive control welding, and FIG. 5(b) illustrates the corresponding change over time of the welding current, electrical resistance, and cumulative amount of heat generated.

As illustrated in FIG. 4(a), in the test welding, a nugget diameter of 6.3 mm was achieved, and splashing did not occur. However, as illustrated in FIG. 5(a), in the actual one-step adaptive control welding, surface splashing occurred from the steel sheet surface.

Here, the targeted cumulative amount of heat generated in the test welding at the point in time of 9.5 cyc where the surface splashing occurred was 195 J which was almost equal to the cumulative amount of heat generated of the adaptive control welding of 190 J.

Next, resistance spot welding was performed on sheet assemblies in which two thin steel sheets shown in Table 1 were overlapped, under the welding conditions shown in the table to produce weld joints. Further, welding conditions in adaptive control refers to the welding conditions in test welding performed in the absence of existing welds.

For the obtained weld joint, the weld was cut and the cross section thereof was etched, and then observed under an optical microscope to measure the nugget diameter. Cases where a nugget diameter of 4.5√t or more was obtained and splashing did not occur were evaluated as satisfactory (A), and cases where the nugget diameter was less than 4.5√t and/or splashing occurred were evaluated as poor (B).

TABLE 1

| No. | Steel Sheet Strength (MPa) | Sheet Thickness (mm) | Electrode Force (kN) | First Step Current (kA) | First Step Welding Time (cycle) | Cooling Time between First Step and Second Step (cycle) | Second Step Current (kA) | Second Step Welding Time (cycle) |
|---|---|---|---|---|---|---|---|---|
| 1 | 270 | 1.6 | 3.5 | 7 | 5 | 5 | 9 | 16 |
| 2 | 270 | 1.6 | 3.5 | 7 | 5 | 5 | 9 | 16 |
| 3 | 270 | 1.6 | 3.5 | 9 | 5 | 10 | 9 | 16 |
| 4 | 270 | 1.6 | 3.5 | 9 | 5 | 10 | 9 | 16 |
| 5 | 270 (GA Coating) | 1.6 | 3.5 | 9.5 | 5 | 10 | 9.5 | 16 |
| 6 | 270 (GA Coating) | 1.6 | 3.5 | 9.5 | 5 | 10 | 9.5 | 16 |
| 7 | 270 | 1.6 | 3.5 | 5 | 5 | 1 | 9 | 16 |
| 8 | 270 | 1.6 | 3.5 | 5 | 5 | 1 | 9 | 16 |
| 9 | 270 | 1.6 | 3.5 | 5 | 10 | 5 | 9 | 16 |
| 10 | 270 | 1.6 | 3.5 | 5 | 10 | 5 | 9 | 16 |
| 11 | 270 | 1.0 | 2.5 | 7 | 5 | 5 | 9 | 16 |
| 12 | 270 | 1.0 | 2.5 | 6 | 5 | 5 | 8 | 14 |
| 13 | 270 | 1.0 | 2.5 | 6 | 5 | 5 | 8 | 14 |
| 14 | 980 | 1.6 | 3.5 | 5.5 | 5 | 5 | 7.5 | 16 |
| 15 | 980 | 1.6 | 3.5 | 5.5 | 5 | 5 | 7.5 | 16 |
| 16 | 1180 | 1.6 | 5 | 7 | 5 | 5 | 8.5 | 16 |
| 17 | 1180 | 1.6 | 5 | 7 | 5 | 5 | 8.5 | 16 |
| 18 | 270 | 1.6 | 3.5 | 7 | 5 | 5 | 9 | 16 |
| 19 | 270 | 1.6 | 3.5 | 9 | 16 | — | — | — |
| 20 | 270 | 1.6 | 3.5 | 9 | 16 | — | — | — |
| 21 | 270 | 1.6 | 3.5 | 9 | 5 | — | 9 | 16 |

| No. | Presence of Existing Weld, Distance between Centers of Points (mm) | Control Method | Evaluation | Remarks |
|---|---|---|---|---|
| 1 | None | Two-step Adaptive Control Welding | A | Example |
| 2 | 10 | Two-step Adaptive Control Welding | A | Example |
| 3 | None | Two-step Adaptive Control Welding | A | Example |
| 4 | 10 | Two-step Adaptive Control Welding | A | Example |
| 5 | None | Two-step Adaptive Control Welding | A | Example |
| 6 | 10 | Two-step Adaptive Control Welding | A | Example |
| 7 | None | Two-step Adaptive Control Welding | A | Example |
| 8 | 10 | Two-step Adaptive Control Welding | A | Example |
| 9 | None | Two-step Adaptive Control Welding | A | Example |
| 10 | 10 | Two-step Adaptive Control Welding | A | Example |
| 11 | None | Two-step Adaptive Control Welding | A | Example |
| 12 | None | Two-step Adaptive Control Welding | A | Example |
| 13 | 10 | Two-step Adaptive Control Welding | A | Example |
| 14 | None | Two-step Adaptive Control Welding | A | Example |
| 15 | 10 | Two-step Adaptive Control Welding | A | Example |
| 16 | None | Two-step Adaptive Control Welding | A | Example |
| 17 | 10 | Two-step Adaptive Control Welding | A | Example |
| 18 | 10 | Constant Current Control | B: Insufficient Nugget Diameter | Comparative Example |
| 19 | 10 | Constant Current Control | B: Insufficient Nugget Diameter | Comparative Example |

TABLE 1-continued

| 20 | 10 | One-step Adaptive Control Welding | B: Splashing Occurred | Comparative Example |
| 21 | 10 | Two-step Adaptive Control Welding | B: Splashing Occurred | Comparative Example |

It can be seen from Table 1 that, in all of our examples, splashing did not occur, and nuggets with a diameter of $4.5\sqrt{t}$ or more were obtained.

By contrast, in cases of constant current control welding in Nos. 18 and 19, only nuggets with an insufficient diameter were obtained regardless of the presence of the cooling time.

Further, in the case of one-step adaptive control welding in No. 20, splashing occurred.

For No. 21, two-step adaptive control welding was performed in accordance with the prior application described in PTL 4. With this two-step adaptive control welding, although a good nugget was obtained without causing splashing when the target nugget diameter was set to splashing was unavoidable when the target nugget diameter was set to a large diameter of $4.5\sqrt{t}$ or more.

The invention claimed is:

1. A resistance spot welding method to join parts to be welded by squeezing and pressing the parts between a pair of electrodes and passing current, the parts being a plurality of overlapping metal sheets, the method comprising:
    performing test welding to form an appropriate nugget by (i) passing welding current with constant current control between electrodes in two or more steps, and (ii) storing as a target value for each step a time variation of an instantaneous amount of heat generated per unit volume and a cumulative amount of heat generated per unit volume that are calculated from an electrical property between the electrodes; and
    subsequently, actual welding in two or more steps corresponding to the two or more steps in the test welding using, as a standard, a time variation curve of the instantaneous amount of heat generated per unit volume obtained by the test welding; and
    when a time variation amount of an instantaneous amount of heat generated deviates during any step of the two or more steps in the actual welding from the time variation curve by a difference, performing adaptive control welding to control a current passage amount in order to compensate for the difference during a remaining welding time of a total welding time in the step so as to match a cumulative amount of heat generated in the actual welding to the cumulative amount of heat generated that is determined in advance in the test welding,
    wherein the two or more steps in both the test welding and the actual welding comprise a first step of securing a current path between the sheets directly below the electrodes and a subsequent second step of forming a nugget having a predetermined diameter,
    a time during which no welding current is applied is provided between the first step and the subsequent second step in both the test welding and the actual welding, and
    during the adaptive control welding, the total welding time in the step is held constant.

2. The method according to claim 1, wherein the time during which no welding current is applied is one cycle or more and ten cycles or less.

3. The method according to claim 2, wherein the time during which no welding current is applied is one cycle or more and five cycles or less.

4. The method according to claim 1, wherein a welding time in the first step is one cycle or more and ten cycles or less.

5. The method according to claim 2, wherein a welding time in the first step is one cycle or more and ten cycles or less.

6. The method according to claim 3, wherein a welding time in the first step is one cycle or more and ten cycles or less.

* * * * *